United States Patent [19]

Weng

[11] Patent Number: 6,002,496
[45] Date of Patent: Dec. 14, 1999

[54] SHEET-FED SCANNER WITH A PREVIEW FUNCTION

[75] Inventor: Han-Chang Weng, Chia-I, Taiwan

[73] Assignee: Acer Pheripherals, Inc., Taoyuan, Taiwan

[21] Appl. No.: 09/013,816

[22] Filed: Jan. 27, 1998

[30] Foreign Application Priority Data

Aug. 6, 1997 [TW] Taiwan ................................ 86111281

[51] Int. Cl.⁶ .............................. H04N 1/04; G03F 3/10
[52] U.S. Cl. ......................... 358/498; 358/496; 358/474; 358/488; 358/527
[58] Field of Search .................................. 358/498, 496, 358/497, 474, 488, 486, 401, 527, 451, 537, 505, 506, 449; 250/208.1, 234–236; 382/312; 271/265.01, 265.02, 272; 299/370, 371

[56] References Cited

U.S. PATENT DOCUMENTS

| | | | |
|---|---|---|---|
| 4,558,373 | 12/1985 | Plasencia et al. | 358/496 |
| 5,295,204 | 3/1994 | Parulski | 358/527 |
| 5,499,108 | 3/1996 | Cotte et al. | 358/498 |
| 5,687,010 | 11/1997 | Van Tilborg et al. | 358/496 |
| 5,841,553 | 11/1998 | Neukermans | 358/494 |

*Primary Examiner*—Edward L. Coles
*Assistant Examiner*—Cheukfan Lee

[57] ABSTRACT

The present invention provides a sheet-fed scanner which can preview a document. The sheet-fed scanner comprises a housing having an opening for feeding a document to be scanned, a scanning module installed in the housing for scanning the document, a driving mechanism for driving the document forward and backward, first and second sensors installed at a front end and a rear end of the driving mechanism for detecting the document, and a control circuit for controlling operations of the scanner. When the document is fed into the opening and detected by the first sensor, the control circuit uses the driving mechanism to drive the document forward until the document is detected by the second sensor. And when the control circuit receives a preview instruction, the control circuit uses the driving mechanism to drive the document forward and uses the scanning module to perform a preview scan over the document until the document is no longer detected by the first sensor. And then the control circuit will use the driving mechanism to drive the document backward for a normal scan.

8 Claims, 4 Drawing Sheets

SHEET-FED SCANNER WITH A PREVIEW FUNCTION

BACKGROUND OF THE INVENTION

1. Field of the Invention

The present invention relates to a sheet-fed scanner, and more particularly, to a sheet-fed scanner with a preview function.

2. Description of the Prior Art

Flatbed scanners are commonly used for scanning document images into computers. Most flatbed scanners can scan documents in high resolution, such as 600×600 dpi or more. However, scanning a complete document in high resolution takes a long time and generates a huge amount of image data. Flatbed scanners usually provide a preview function which can quickly scan a document in low resolution to generate a preview image. A user can then specify one or more target areas on the preview image to instruct the scanner to scan only the designated areas, and the scanner will later on scan the designated areas in high resolution and transmit only the images from the designated areas back to a computer. Such preview function greatly reduces the amount of image data and the elapsed time for scanning a document.

However, prior art sheet-fed scanners can not perform such preview function. Sheet-fed scanners currently available in the market are very compact in size and they are designed to scan a document in one pass and then the document is ejected from the sheet-fed scanner completely. Since the document can not be held inside the sheet-fed scanner, there is no way to perform the above mentioned preview function.

SUMMARY OF THE INVENTION

It is therefore a primary objective of the present invention to provide a sheet-fed scanner which can provide a preview function to solve the above mentioned problem.

In a preferred embodiment, the present invention provides a sheet-fed scanner comprising:

- a housing having an opening for feeding a document to be scanned;
- a scanning module installed in the housing for scanning the document;
- a driving mechanism for driving the document forward and backward;
- a first sensor installed at a front end of the driving mechanism for detecting the document;
- a second sensor installed at a rear end of the driving mechanism for detecting the document; and
- a control circuit for controlling operations of the scanner; wherein when the document is fed into the opening and detected by the first sensor, the control circuit will use the driving mechanism to drive the document forward until the document is detected by the second sensor, and when the control circuit receives a preview instruction, the control circuit will use the driving mechanism to drive the document forward and use the scanning module to perform a preview scan over the document until the document is no longer detected by the first sensor, and then the control circuit will use the driving mechanism to drive the document backward for a normal scan.

It is an advantage of the present invention that the sheet-fed scanner can perform a preview scan over a document before normally scanning the document in high resolution. A user can thus use the preview function of the sheet-fed scanner to specify the target areas and reduce the amount of data and time required for scanning a document.

These and other objectives of the present invention will no doubt become obvious to those of ordinary skill in the art after reading the following detailed description of the preferred embodiment which is illustrated in the various figures and drawings.

DETAILED DESCRIPTION OF THE PREFERRED EMBODIMENT

Figure 1:
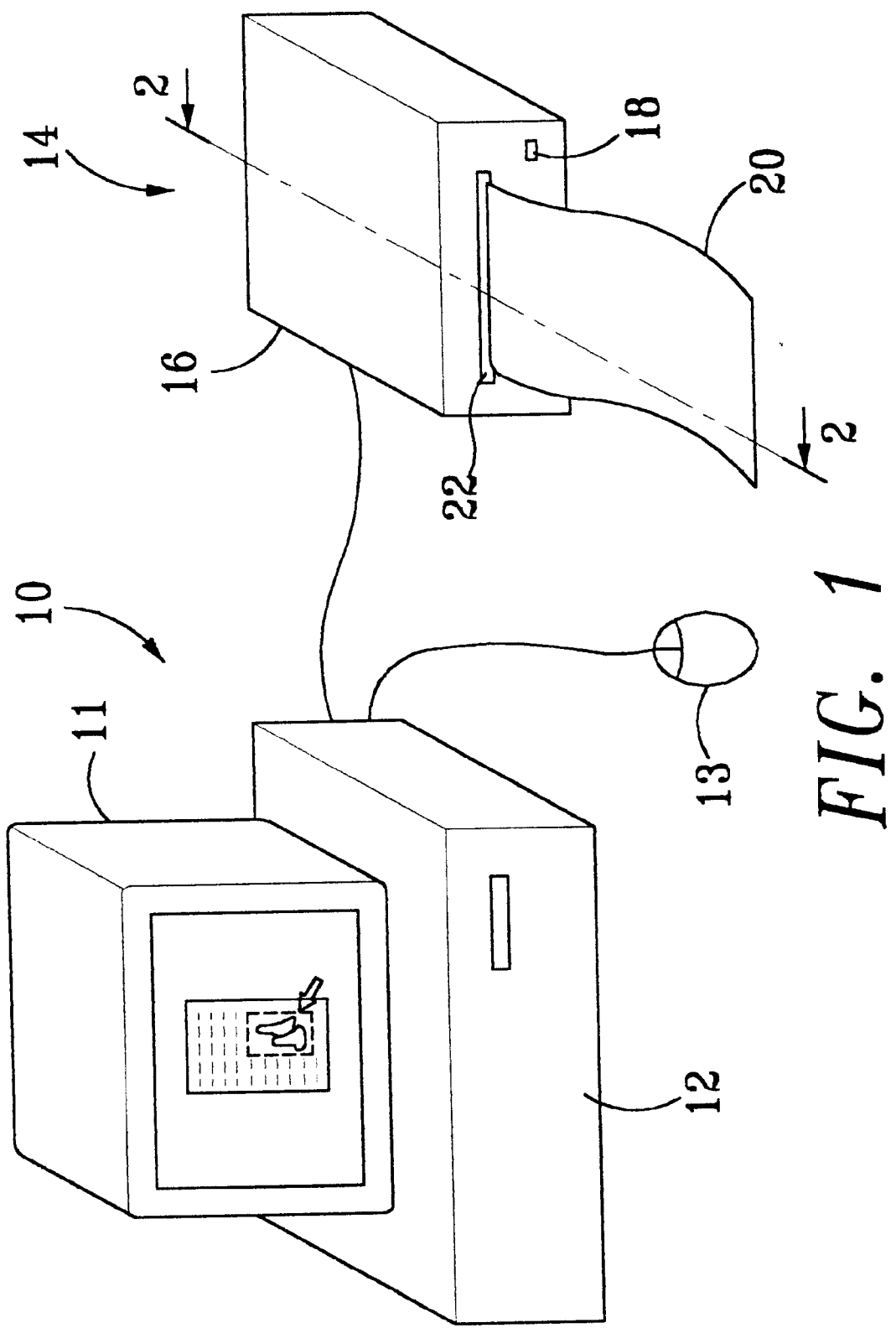
FIG. 1 is a perspective view of a sheet-fed scanner connected to a computer system according to the present invention.

Please refer to FIG. 1. FIG. 1 is a perspective view of a sheet-fed scanner 14 connected to a computer system 10 according to the present invention. The computer system 10 comprises a displaying device 11, a mouse 13, and a computer 12 connected to the displaying device 11 and the mouse 13. The scanner 14 comprises a housing 16 with a front opening 22 installed at the front side of the housing 16 for feeding a document 20 into the scanner 14, and a preview button 18 for initiating a preview scan.

Figure 2:
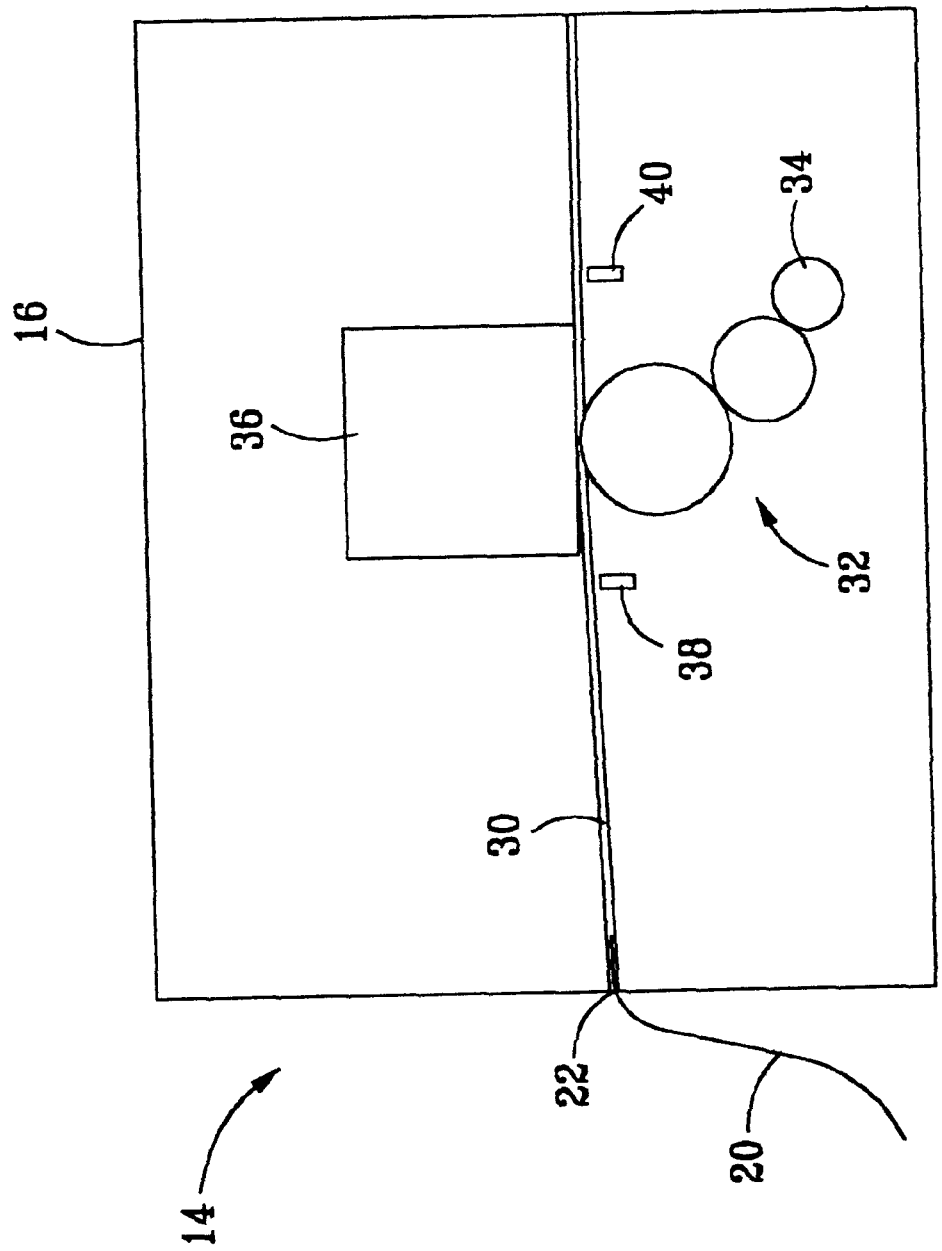
FIG. 2 is a cross-sectional view of the sheet-fed scanner along line 2—2 shown in FIG. 1.

Please refer to FIG. 2. FIG. 2 is a cross-sectional view of the sheet-fed scanner 14 along line 2—2 shown in FIG. 1. The sheet-fed scanner 14 comprises a document path 30, a front opening 22 at the front end of the document path 30 for feeding the document 20, a scanning module 36 installed in the middle of the document path 30 for scanning the document 20, a roller wheel 32 rotatably in contact with the scanning module 36 for driving the document 20 through the scanning module 36, a stepping motor 34 for driving the roller wheel 32 forward and backward, two sensors 38 and 40 installed along the document path 30 and positioned at front and rear sides of the roller wheel 32 respectively for detecting the document 20.

Figure 3:
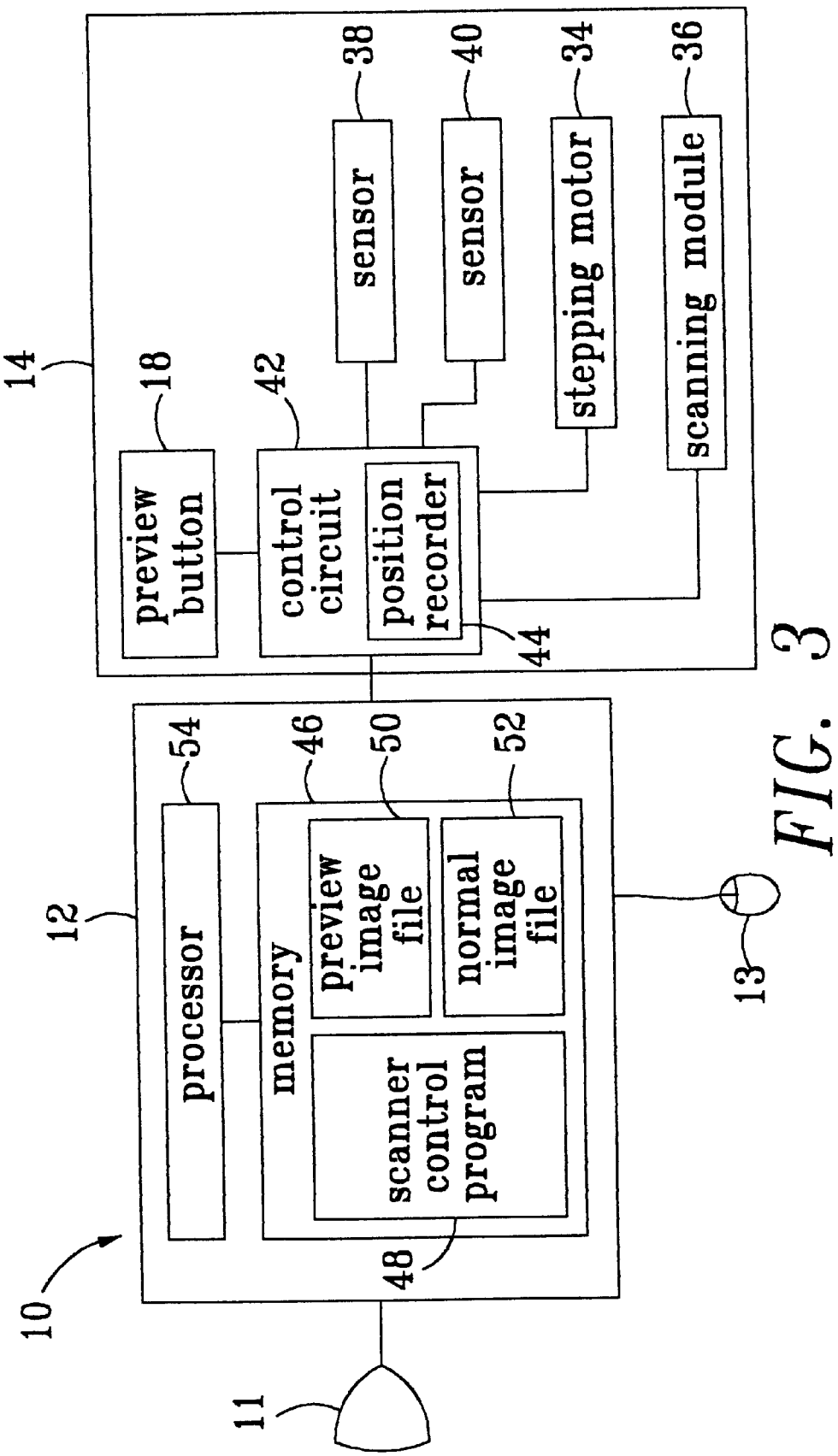
FIG. 3 is a function block diagram of the computer system and sheet-fed scanner shown in FIG. 1.

Please refer to FIG. 3. FIG. 3 is a function block diagram of the computer system 10 and the sheet-fed scanner 14 shown in FIG. 1. The sheet-fed scanner 14 comprises a control circuit 42 wired to the stepping motor 34, scanning module 36, sensors 38 and 40, and preview button 18 for controlling operations of the scanner 14. The control circuit 42 comprises a position recorder 44 for recording the number of forward and backward steps of the stepping motor 34 to track the position of the document 20 in the document path 30.

The computer system 10 comprises a displaying device 11 for displaying images, a mouse 13, and a computer 12 connected to the displaying device 11 and the mouse 13. The computer 12 comprises a memory 46 which can store a scanner control program 48, a preview image file 50 generated by the scanning module 36 of the scanner 14 after performing a preview scan over the document 20, and a normal image file 52 generated by normally scanning the document 20. The computer 12 further comprises a processor 54 for executing the scanner control program 48.

Figure 4:
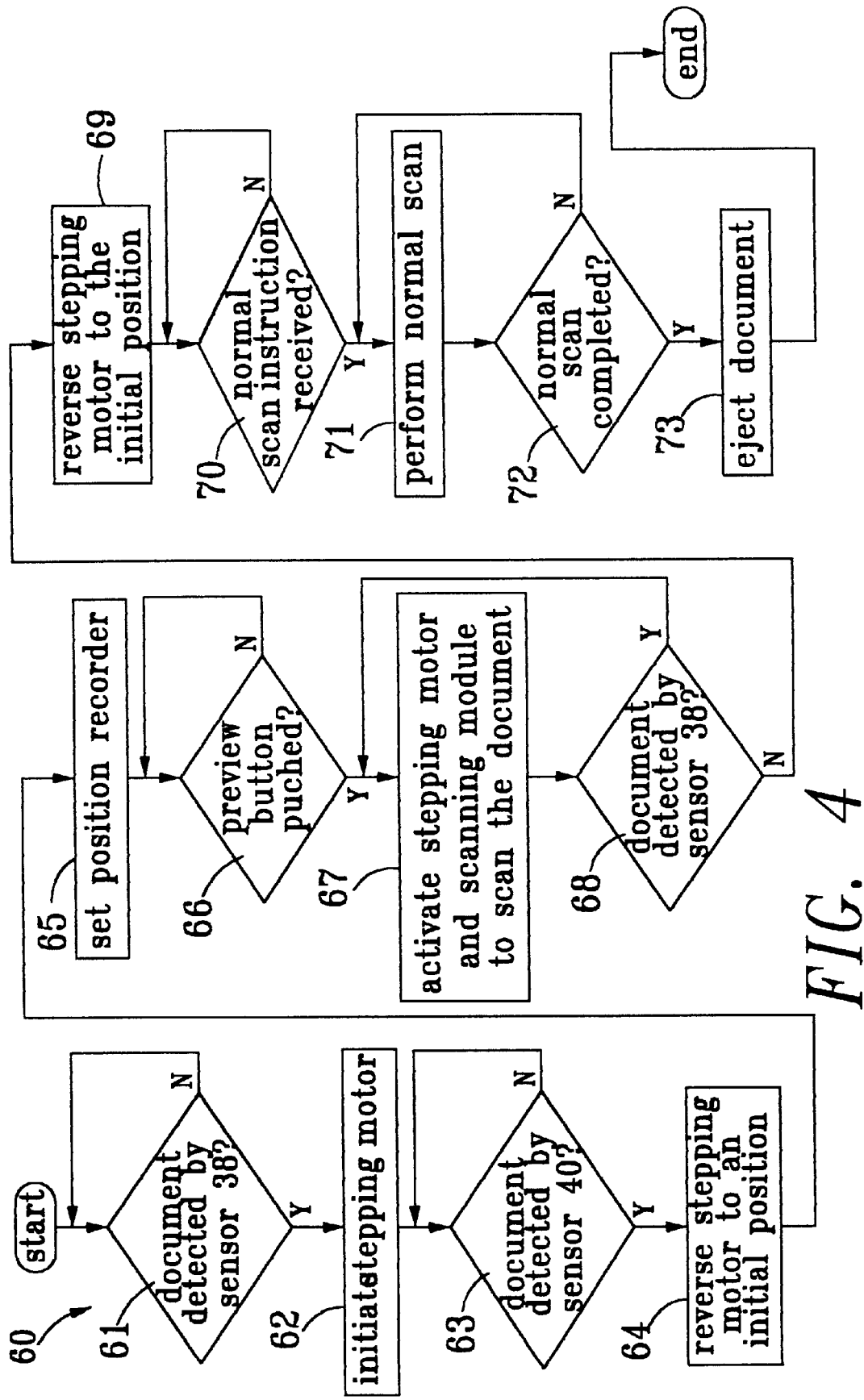
FIG. 4 is a flowchart of a preview scan and normal scan process of the sheet-fed scanner shown in FIG. 1.

Please refer to FIG. 4. FIG. 4 shows a flowchart of a process 60 for performing a preview scan and a normal scan over the document 20 by the control circuit 42 shown in FIG. 3. The process 60 comprises the following steps:

step 61:check if the document 20 is detected by the sensor 38; if not, check again;

step 62:initiate the stepping motor 34 to drive the document 20 forward;

step 63:check if the document 20 is detected by the sensor 40; if not, check again;

step 64:reverse the stepping motor 34 a predetermined number of steps to move the document 20 to an initial position which is right below the scanning module 36; the number of reverse steps is determined by the distance between the sensor 40 and the scanning module 36;

step 65:record the initial position in the position recorder 44;

step 66:check if the preview button 18 is pushed; if not, check again; step 67:activate the stepping motor 34 to drive the document 20 forward, start tracking the document position by using the position recorder 44, and activate the scanning module 36 to perform a preview scan over the document 20;

step 68:check if the document 20 is detected by the sensor 38; if yes, go to step 67;

step 69:use the stepping motor 34 to forward the document 20 a predetermined number of steps to scan the last portion of the document 20, and then reverse the stepping motor 34 to drive the document 20 backward to the initial position; the number of forward steps is determined by the distance between the sensor 38 and the scanning module 36;

step 70:check if a normal scan instruction specifying at least one designated area has received; if not, check again;

step 71:use the stepping motor 34 to drive the document 20 forward and use the scanning module 36 to perform a normal scan over the designated area;

step 72:check if the normal scan is finished; if not, go to step 71;

step 73:use the stepping motor 34 to eject the document 20.

In step 66, when a user pushes the preview button 18, a preview instruction will be recognized by the control circuit 42 to perform a preview scan. The preview image generated by the scanning module 36 will be transmitted to the computer 12 and the scanner control program 48 will generate the preview image file 50 accordingly. The preview instruction can also be issued by a user through the scanner control program 48. After the scanner control program 48 generates the preview image file 50, the scanner control program 48 will instruct the displaying device 11 to display the preview image stored in the preview image file 50, so that the user can specify at least one target area to be scanned. And the scanner control program 48 will issue a normal scan instruction to the scanner 14 to scan the designated area of the document 20. The image data generated by the normal scan will be stored in the normal image file 52.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A sheet-fed scanner comprising:
   a housing having an opening for feeding a document to be scanned;
   a scanning module installed in the housing for scanning the document;
   a driving mechanism for driving the document forward and backward;
   a first sensor installed at a front end of the driving mechanism for detecting the document;
   a second sensor installed at a rear end of the driving mechanism for detecting the document; and
   a control circuit for controlling operations of the scanner;
   wherein when the document is fed into the opening and detected by the first sensor, the control circuit will use the driving mechanism to drive the document forward until the document is detected by the second sensor, and when the control circuit receives a preview instruction, the control circuit will use the driving mechanism to drive the document forward and use the scanning module to perform a preview scan over the document until the document is no longer detected by the first sensor, and then the control circuit will use the driving mechanism to drive the document backward for a normal scan.

2. The sheet-fed scanner of claim 1 wherein the driving mechanism comprises a roller wheel rotatably in contact with the scanning module for moving the document through the scanning module and a stepping motor for driving the roller wheel forward and backward.

3. The sheet-fed scanner of claim 2 wherein the control circuit comprises a position recorder for tracking the position of the document and an initial position will be set at the position recorder when the document is detected by the second sensor after fed into the scanner.

4. The sheet-fed scanner of claim 1 wherein when the control circuit receives a scanning instruction having at least one designated scanning area after performing the preview scan, the control circuit will use the driving mechanism to drive the document forward and use the scanning module to scan the designated scanning area within the document.

5. The sheet-fed scanner of claim 4 wherein the control circuit is connected to a computer system which comprises a displaying device, a memory for storing a scanner control program and a preview image file generated by the scanning module after performing the preview scan, and a processor for executing the scanner control program wherein after received the preview image file, the scanner control program will display the preview image file on the displaying device for a user to designate at least one scanning area, and the scanner control program will generate the scanning instruction according to the designated scanning area to control the sheet-fed scanner.

6. The sheet-fed scanner of claim 5 wherein the preview instruction is generated by the scanner control program for initiating the sheet-fed scanner to perform the preview scan.

7. The sheet-fed scanner of claim 5 further comprising a preview button electrically connected to the control circuit for generating the preview instruction wherein when a user presses the preview button, the control circuit will be initiated to perform the preview scan.

8. A method for previewing a document by using a sheet-fed scanner, the scanner comprising:
- a housing having an opening for feeding a document to be scanned;
- a scanning module installed in the housing for scanning the document;
- a driving mechanism for driving the document forward and backward;
- a first sensor installed at a front end of the driving mechanism for detecting the document;
- a second sensor installed at a rear end of the driving mechanism for detecting the document; and
- a control circuit for controlling operations of the scanner;

the method comprising:
- (1) using the driving mechanism to drive the document forward until the document is detected by the second sensor;
- (2) using the scanning module to perform a preview scan over the document until the document is no longer detected by the first sensor;
- (3) using the driving mechanism to drive the document backward for a normal scan.

* * * * *